Patented June 9, 1942

2,285,573

UNITED STATES PATENT OFFICE 2,285,573

ZINC CHLORIDE RECOVERY FROM GALVANIZER'S SAL-AMMONIAC SKIMMINGS

Samuel F. Dubs, Los Angeles, Calif., assignor to Morris P. Kirk & Son, Inc., Los Angeles, Calif., a corporation of Nevada No Drawing. Application August 28, 1939,
Serial No. 292,285

1 Claim. (Cl. 23—97)

This invention relates to the recovery of zinc chloride from metalliferous materials, and relates more particularly to the recovery of zinc chloride from a waste material known as galvanizer's sal-ammoniac skimmings.

In the galvanizing of metals a flux is used to cover the molten zinc to protect it against oxidation and also to remove oxides from the metal being dipped therein. This flux originally comprises ammonium chloride or sal-ammoniac, but during its use it gradually becomes converted to other materials and thickens in consistency. From time to time portions of the thickened flux are skimmed off and replaced with fresh ammonium chloride and the material thus removed is known as galvanizer's sal-ammoniac skimmings.

These skimmings may contain as high as 50% of zinc, largely in combined form, and hence it is economically desirable to treat this waste material to recover the zinc.

It is an object of the present invention to provide a process for recovery of zinc and chlorine values present in galvanizer's skimmings.

When cool, the skimmings solidify to a solid which is extremely difficult to handle. A large portion of this material is insoluble in water, and even the soluble portion dissolves only slowly and with difficulty. It is sufficiently deliquescent or sticky that it is impossible to satisfactorily dry-grind the material. Furthermore, the solidified skimmings usually contain appreciable quantities of dirt, metallic iron and/or zinc, and other high melting impurities which are preferably removed prior to refining.

It is an object of the present invention to provide a process of the kind described in which the skimmings are conveniently and economically prepared for refining including the separation of high melting point solid impurities.

Roasting processes have been proposed for the treatment of galvanizer's skimmings whereby the entire zinc content is converted to zinc oxide. The crude skimmings, however, originally contain a substantial percentage of zinc chloride, which is an economically valuable form of zinc.

It is an object of the present invention to provide a process of the kind described in which the zinc is recovered largely as zinc chloride, and in which the original content of the skimmings in zinc chloride is substantially preserved.

Briefly stated, my process comprises heating the skimmings to drive off the ammonia and dispersing the molten residue in water to form eventually a plastic dispersion or gel. This slurry comprises zinc oxide, zinc chloride, and very minor proportions of impurities and may be acidified with hydrochloric acid to obtain a zinc chloride solution containing in chloride form substantially all of the zinc originally associated in combined form with the skimmings.

Further objects and aspects of my invention will be evident from the following more detailed discussion of my process.

The skimmings as received from the galvanizer are normally contained in iron drums in which the skimmings have been allowed to solidify. I place these drums on an inclined melting rack with the open end lowered, and allow a gas flame to play directly on the solid skimmings. The skimmings melt and are passed in a molten state into a trough or trap in which the solid high melting impurities such as zinc metal, iron, sand, dirt, and the like are allowed to settle. From time to time the trough may be raked free of these solid impurities which have settled to the bottom thereof. From the trap the molten skimmings are passed to a refining apparatus, suitably a pot constructed of corrosion resistant metal and adapted to be heated.

One typical sample of material thus charged to the refining apparatus shows the following composition on analysis:

| | Per cent |
|---|---|
| Zinc | 48.92 |
| Chlorine | 42.00 |
| Ammonia | 3.83 |

This analysis is indicative of the following hypothetical composition:

| | Per cent |
|---|---|
| Zinc chloride | 65.43 |
| Zinc oxide | 21.83 |
| Ammonium chloride | 12.03 |

When the refining apparatus has been charged with the molten skimmings, it is heated and agitated until the ammonia content of the charge has been reduced to the desired value. The melting point of the skimmings is usually in the neighborhood of about 250° C. As the temperature gradually increases, for example to around 300° C., a copious evolution of ammonia is obtained. By covering the apparatus and connecting it with a suitable gas scrubbing system, this ammonia can be recovered in a substantially pure state, preferably as aqueous ammonium hydroxide.

One suitable method of handling the effluent vapors is to provide a hole in one part of the apparatus cover through which air may be inducted. A vapor outlet on another portion of the cover is then connected with the suction of a gas blower through a long series of air cooled pipes which serve to reduce the temperature of the gases before contact with the blower. The effluent from the blower, comprising air drawn in through the cover and ammonia gas evolved from the heated charge, may then be passed through a series of water scrubbers to remove and recover the ammonia.

Most of the ammonia gas that will be evolved during the refining process is evolved during this early period of heating when the temperatures of the melt are in the neighborhood of 300° C. or somewhat higher. As a general rule, however, the ammonia content of the melt is not sufficiently reduced by whatever reactions underlie the expelling of the gaseous ammonia at these relatively low temperatures and I therefore continue the heating at more elevated temperatures to drive off the remaining quantities of ammonia and/or ammonia-containing compounds. For example, the temperature can be increased up to about the boiling point of zinc chloride, which I regard as a maximum temperature not to be exceeded since it is not desired that the zinc chloride by volatilized. I have found, however, that it is usually unnecessary to approach this maximum temperature to obtain the desired degree of de-ammoniation, and that adequate removal of ammoniacal compounds may be had by maintaining the melt for a suitable length of time at a more moderate temperature; for example, a temperature of about 450–485° C. In this temperature region the rate of de-ammoniation is somewhat less than at more elevated temperatures, but in general this temperature region is preferred since at these temperatures the de-ammoniation is accomplished with less mechanical loss of zinc chloride and substantially less corrosion of the equipment than would take place at or near the maximum temperature.

The vapors given off from the apparatus during the final high temperature period of the heating; e. g., at temperatures of 450–485° C., condense to form a white solid which I have identified by analysis as zinc chloride ammonia ($ZnCl_2 2NH_3$). During this phase of the operation the effluent fumes from the refining apparatus may be cooled in the same apparatus as before, but the discharge of the blower is best handled by passing it through wool bags which serve to filter the air and retain the solid zinc chloride ammonia.

It is very advantageous to provide agitation for the charge in the refining apparatus during the entire heating period. In the absence of suitable agitation there is a pronounced tendency for the charge to cake on the sides and the bottom of the apparatus, and, furthermore, the evolution of the volatile constituents, particularly the zinc chloride ammonia, is greatly accelerated by suitable agitation. Various means may be used to provide agitation, such as agitating the charge with a current of steam, or air, but in general I find that mechanical agitation such as is provided by motor driven paddles is best.

The heating and agitation is continued until the melt shows a sufficiently low content in ammonia; for example, from .2% to .6% by weight. This nominal percentage may be varied at will, depending on the desired purity of the final product, but is preferably below 1%.

The melt at this final stage contains from 95% to 96% of the zinc originally charged to the refining apparatus, since only about 4% or 5% of the zinc is removed as zinc chloride ammonia. I find that this melt consists principally of zinc chloride and zinc oxide, the respective amounts thereof having a ratio of about 10 to 3. This represents a somewhat larger ratio of zinc chloride to zinc oxide than originally present in the skimmings and apparently indicates that some of the oxide has been converted to chloride by the action of the ammonium chloride during the heating.

If the final melt is allowed to cool and solidify, a solid is obtained which is very difficult to handle in much the same way as the original galvanizer's sal-ammoniac skimmings. Thus it is only partially soluble in water and can be leached only with great difficulty and it is furthermore very difficult to break up or grind up into a finely divided form suitable for further reaction.

I avoid these difficulties by dispersing the hot melt in water to form a dispersion or gel which may be pumped while hot and shoveled when cold, and which is very readily reacted upon by further reagents.

To obtain the dispersion, I pump the hot melt at a temperature of about 480° C. or thereabouts into a tank partially filled with water and provided with efficient stirring means. The water is brought to its boiling point by the heat contained in the hot melt and a portion of it is lost by vaporization so that I usually find it advisable to add further quantities of water as the transfer of the melt to the emulsion tank is continued. The contents of the emulsion tank are kept vigorously agitated at all times so that the melt is thoroughly dispersed therein. A part of the zinc chloride doubtless dissolves in the water, but the zinc oxide and possibly some of the zinc chloride remain dispersed as fine undissolved particles in the aqueous medium. In general I find it very convenient to so adjust the quantities of melt and water that a dispersion is obtained which is of pumpable consistency while hot, but which will set up to a mud or gel on cooling, so that it can thereafter be handled by means of shovels or similar devices.

An empirical test which I have found useful to control the composition of the dispersion is to dip a ladle into the content of the emulsion tank and remove it full of the dispersion. If the dispersion sets up to a gel in the ladle after the latter stands a few minutes in the air, sufficient of the melt has been added to the emulsion batch. An excess of melt should in general be avoided since it tends to thicken the hot emulsion to a non-pumpable consistency.

One or more batches of emulsion may be thus prepared according to the amount of melt which it is required to treat and the hot dispersion pumped to storage bins, suitably water-tight bins constructed of wood. After 24 hours or so the contents of the storage bins will have cooled sufficiently to set up to the desired slurry or gel.

Apart from the water, this gel has about the same chemical constitution as the melt; namely, the zinc content is distributed between zinc chloride and zinc oxide, in about the ratio of 10 to 3. It is understood, of course, that the molecular species thus indicated are purely hypothetical since there may be intermediate compounds present such as zinc oxychloride. It is usually desirable to treat this gel with hydrochloric acid, suitably commercial muriatic acid, in order to convert the zinc oxide and/or zinc oxychloride into zinc chloride. This may be very readily accomplished by transferring the gel to a reaction vessel provided with a mechanical agitator and there treating it with sufficient concentrated muriatic acid to produce a solution which is slightly acidic corresponding to the normal acidity of aqueous zinc chloride solutions.

As a rule, there is a small quantity of dark colored carbonaceous material which is not brought into solution by treatment of the gel with muriatic acid. This residue may be readily removed by filtration. I find it convenient, prior to such a filtration step, to add a small quantity of zinc dust to precipitate various metallic impurities, such as lead or copper, which may be present in very minor amounts. After filtering, the solution may be further refined, if desired, suitably by conventional methods adapted to remove small amounts of iron and similar impurities, whereby a water-white solution of commercially pure zinc chloride may be obtained.

Among the many advantages resident in my process are the recovery of the zinc in an economically valuable form, namely zinc chloride, in which recovery substantially all of the zinc originally present as zinc chloride is recovered unaltered; the ease of handling the materials being processed which are present throughout the process in either a molten or dispersed state; and the reduction of reagent consumption to the minimum, namely not more than that quantity of HCL necessary to react with the basic zinc oxide originally present in the skimmings.

It is understood that the detail with which I have described my process is not intended to be limiting, but rather illustrative, and that various modifications of my process may be practiced without departing from the essence of my invention as defined by the scope of the appended claim.

I claim as my invention:

A method of removing ammonia and ammonium compounds from galvanizer's sal-ammoniac skimmings for the purpose of producing zinc chloride which is substantially free from ammonium compounds, which includes the steps of: heating the skimmings to a temperature of about 300° C. for the purpose of forming a molten bath containing zinc chloride; maintaining said bath at said temperature until the free ammonia has substantially vaporized; raising the temperature of said bath to about 450° C.; agitating the bath until substantially all the zinc chloride ammonia has been vaporized and driven from said bath; dispersing the hot melt in a quantity of water sufficient to form a gel of such consistency that it may be pumped while hot and shoveled when cold; adding hydrochloric acid to said gel in an amount sufficient to convert any zinc oxide carried therein into zinc chloride; and thereafter separating all solid matter from the resulting solution by filtration.

SAMUEL F. DUBS.